United States Patent [19]

Cook

[11] Patent Number: 5,055,992
[45] Date of Patent: Oct. 8, 1991

[54] CONTROL FOR FULL-BRIDGE INVERTER

[75] Inventor: Alexander Cook, Rockford, Ill.

[73] Assignee: Sundstrand Corporation, Rockford, Ill.

[21] Appl. No.: 471,621

[22] Filed: Jan. 29, 1990

[51] Int. Cl.⁵ .................................. H02M 7/5387
[52] U.S. Cl. ........................... 363/98; 363/37; 363/132
[58] Field of Search ............... 363/34, 37, 95, 96, 363/98, 132, 137

[56] References Cited

U.S. PATENT DOCUMENTS

| | | | |
|---|---|---|---|
| 4,105,939 | 8/1978 | Culbertson | 363/137 |
| 4,290,108 | 9/1981 | Woehrle et al. | 364/480 |
| 4,370,702 | 1/1983 | Shuey et al. | 363/98 |
| 4,523,269 | 6/1985 | Baker et al. | 363/98 |
| 4,527,226 | 7/1985 | Glennon | 363/95 |
| 4,567,420 | 1/1986 | Beck | 363/138 |
| 4,595,976 | 6/1986 | Parro, II | 363/41 |
| 4,615,000 | 9/1986 | Fujii et al. | 363/98 |
| 4,635,177 | 1/1987 | Shekhawat et al. | 363/132 |
| 4,642,751 | 2/1987 | Schauder | 363/34 |
| 4,654,773 | 3/1987 | Ito et al. | 363/97 |
| 4,719,557 | 1/1988 | Forstbauer et al. | 363/98 |
| 4,720,777 | 1/1988 | Yokoi | 363/96 |
| 4,722,042 | 1/1988 | Asano et al. | 363/96 |
| 4,800,478 | 1/1989 | Takahashi | 363/132 |
| 4,922,400 | 5/1990 | Cook | 363/98 |
| 4,961,130 | 10/1990 | Kirchberg | 363/98 |

Primary Examiner—Steven L. Stephan
Assistant Examiner—Jeffrey Sterrett
Attorney, Agent, or Firm—Marshall, O'Toole, Gerstein, Murray & Bicknell

[57] ABSTRACT

An inverter control for a full-bridge inverter having a plurality of phase legs each of which includes a switch which is operated to produce one of a set of phase output voltages and wherein a neutral voltage is derived from the phase output voltages compares each phase output voltage to a reference and selects a switching pattern for each inverter switch in dependence upon the comparison wherein the selected switching pattern for two of the phases are different. The switches are controlled in accordance with the selected switching patterns whereby the amplitudes of particular harmonics in the inverter output are adjusted to in turn control the amplitude of other harmonics in the inverter output.

5 Claims, 4 Drawing Sheets

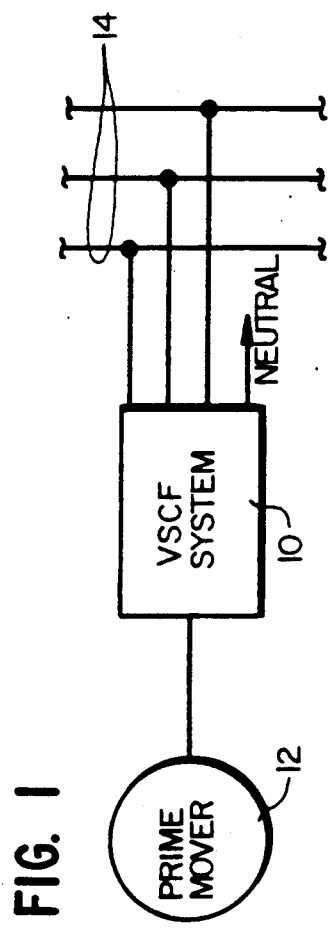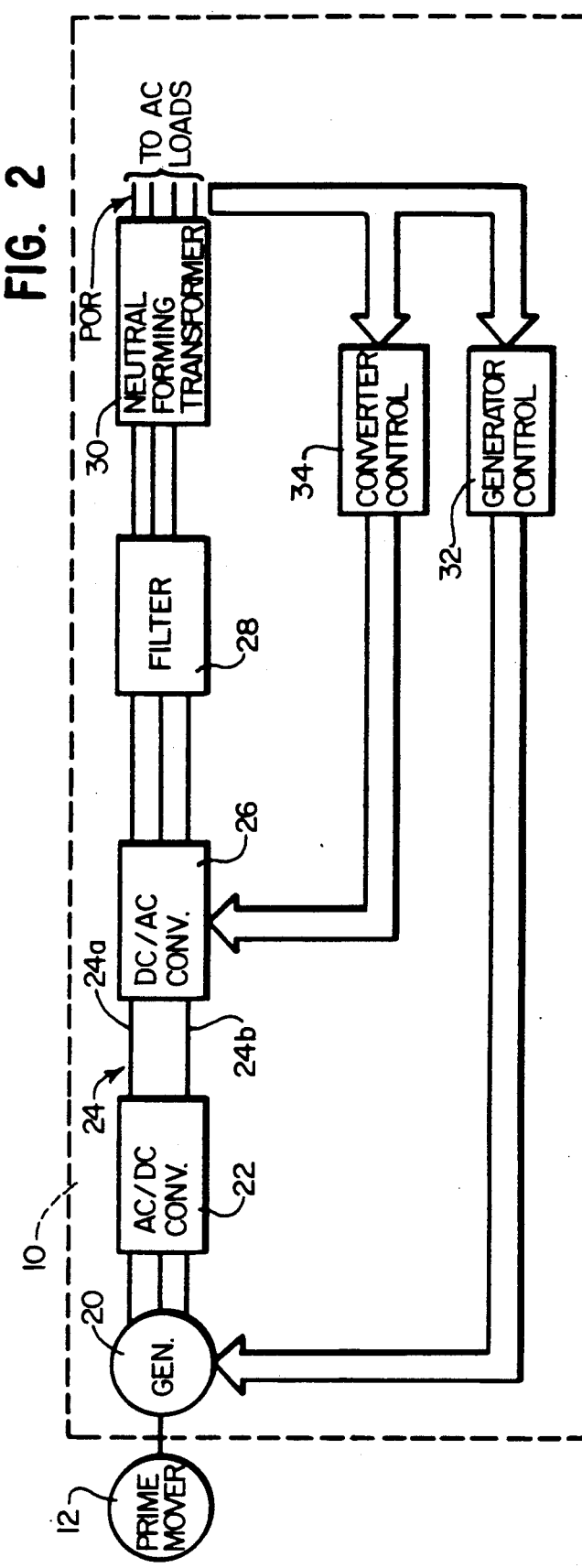

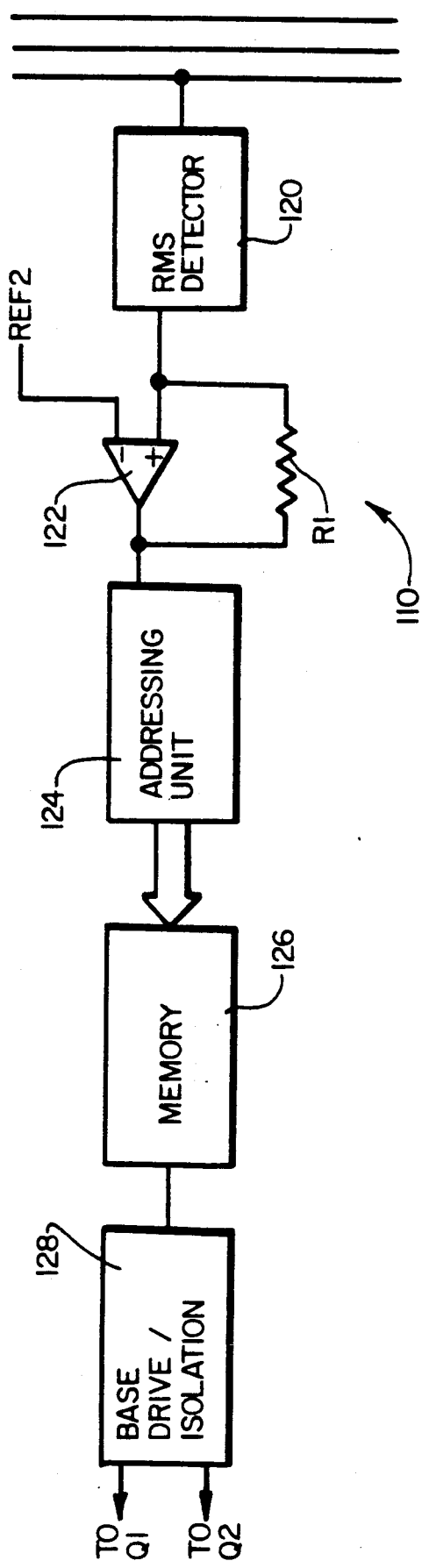

CONTROL FOR FULL-BRIDGE INVERTER

TECHNICAL FIELD

The present invention relates generally to power converters, and more particularly to a control for an inverter.

BACKGROUND ART

Inverters are often used to convert DC power into AC power for one or more AC loads. In the case of polyphase inverters, it is often necessary to produce a neutral voltage which is also supplied to the loads. The neutral voltage can be obtained from the DC voltage provided to the inverter input, in which case the inverter is referred to as the half-bridge type. In a full-bridge type of inverter, the neutral voltage is derived from the phase output voltages.

A polyphase inverter includes a plurality of inverter legs, each of which comprises a pair of series-connected power switches in the form of transistors or thyristors which are connected across the conductors carrying the DC voltage. An inverter control develops pulse-width modulated (PWM) switching patterns which control the switches in each inverter leg. In a half-bridge type of inverter, switching patterns for the inverter switches are selected such that only harmonics which can be easily filtered are present in the inverter output. Generally, the inverter switching patterns are selected such that all harmonics up to the 2N+1th harmonic are cancelled, including triplen (i.e. odd multiple of three) harmonics, where N is the number of pulses per half-cycle produced by the inverter. Thus, in a three-phase half-bridge inverter producing seven pulses per half-cycle, all harmonics up to but not including the fifteenth harmonic are cancelled.

In the case of a full-bridge inverter providing balanced voltages and currents to a polyphase load, triplen harmonics appear not only in each of the phase outputs, but also in the neutral derived from the phase outputs. These triplen harmonics comprise common mode voltages which are in phase and have equal amplitudes. Such common mode voltages do not contribute to harmonic content in the output. However, if the inverter switching patterns for the inverter switches are different from phase to phase, triplen harmonics are produced across one or more phases of the load. These harmonics may increase the total harmonic content in the power provided to the load to an unacceptable level. Thus, as far as applicant is aware, there has been no attempt to individually regulate the output phase voltages of a full-bridge inverter by independently varying the switching patterns for the inverter legs.

An inverter control for a half-bridge inverter is disclosed in Parro II, U.S. Pat. No. 4,595,976, assigned to the assignee of the instant application. Base drive signals for controlling the switches of the inverter are obtained from switching patterns stored in a memory wherein the patterns are retrieved in accordance with one or more operating parameters of the inverter.

A further inverter control is disclosed in Woehrle et al., U.S. Pat. No. 4,290,108.

SUMMARY OF THE INVENTION

In accordance with the present invention, a control for a full-bridge inverter allows individual phase voltage regulation in a simple and inexpensive fashion.

More particularly, a control for a polyphase full-bridge inverter having a plurality of switches compares each phase output voltage produced by the inverter to a reference and selects a switching pattern for each switch of the inverter in dependence upon the comparison wherein the selected switching patterns for two of the phases of the inverter are different. The switching patterns adjust the amplitudes of particular harmonics in the inverter phase voltages relative to the neutral voltage to in turn control the amplitude of other harmonics in the phase voltages relative to the neutral voltage.

The recognition that a certain amount of total harmonic distortion is allowable in the inverter output gives rise to the ability to regulate individual phase voltages. Preferably, the switching patterns are selected so that the amplitudes of non-triplen harmonics in the inverter output are adjusted to limit the amplitudes of triplen harmonics. This, in turn, permits total harmonic distortion to be held below a specified limit.

BRIEF DESCRIPTION OF THE DRAWINGS

FIG. 1 comprises a block diagram of a prime mover in conjunction with a variable-speed, constant-frequency (VSCF) power conversion system;

FIG. 2 comprises a block diagram illustrating the VSCF system of FIG. 1 in greater detail;

FIG. 4 comprises a combined schematic and block diagram of one of the phase controllers of FIG. 3B.

DESCRIPTION OF THE PREFERRED EMBODIMENTS

Figure 3A:
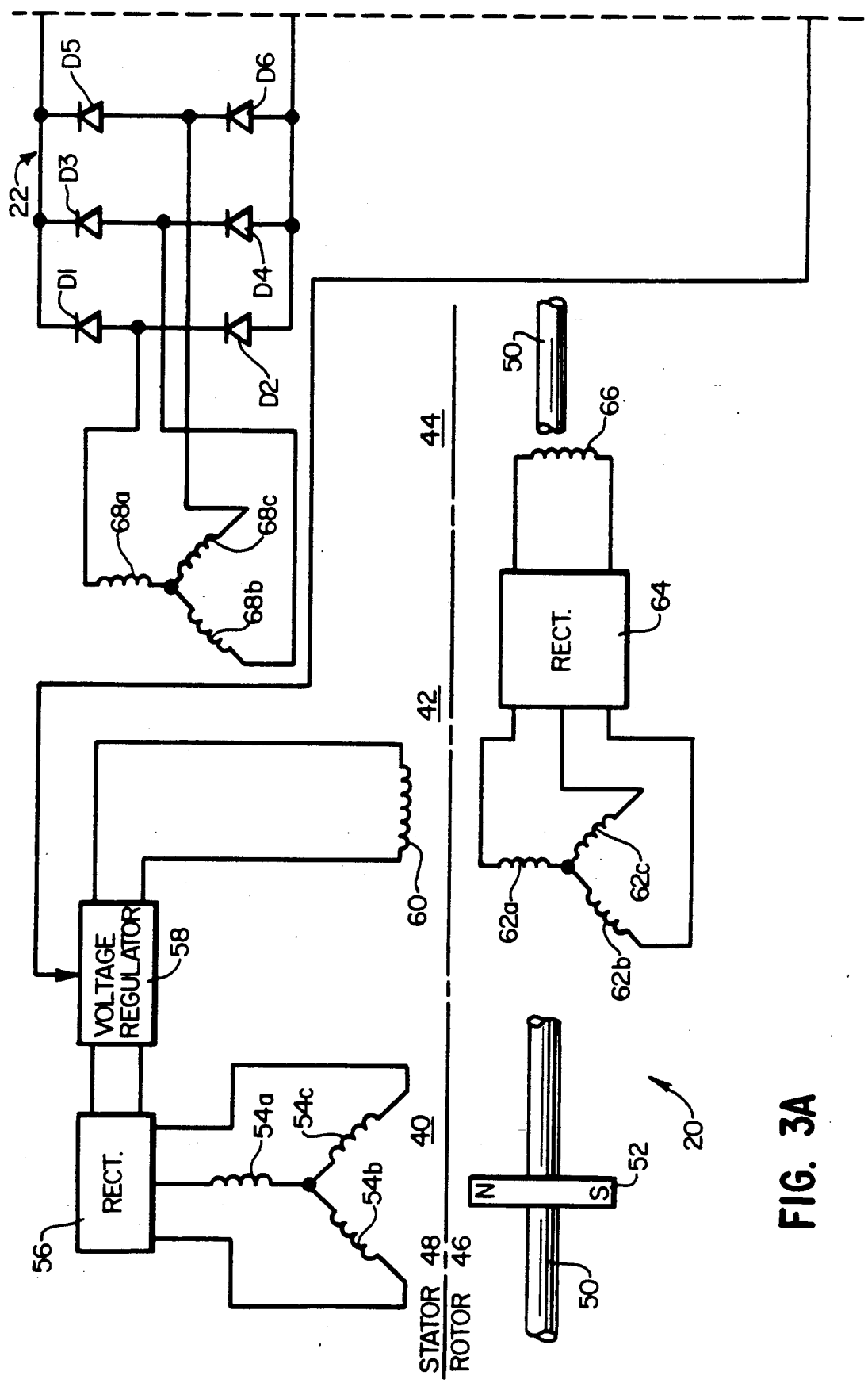
FIGS. 3A and 3B, when joined at the dashed lines with FIG. 3A on the left and FIG. 3B on the right, together comprise a combined schematic and block diagram of a portion of the VSCF system of FIG. 2.

Referring now to FIG. 1, a variable-speed, constant-frequency (VSCF) power conversion system 10 converts variable-speed motive power produced by a prime mover 12 into constant-frequency AC power on an AC load bus 14. The VSCF system 10 further produces a neutral voltage which may be supplied along with the constant-frequency AC power to one or more AC loads coupled to the load bus 14.

It should be noted that various contactors interconnecting the VSCF system 10 with the load bus 14 are not shown for the sake of simplicity.

Referring now to FIG. 2, the VSCF system 10 includes a brushless, synchronous generator 20 which converts the variable-speed motive power into variable-frequency electrical power. The output of the generator 20 is rectified by an AC/DC converter 22 to produce DC power on a DC link 24 comprising first and second DC link conductors 24a, 24b. The DC power is converted into the constant-frequency AC power by a DC/AC converter or inverter 26. Phase output voltages produced by the inverter 26 are filtered by a filter 28 and provided to a neutral forming transformer 30 which derives the neutral voltage from the phase voltages.

The VSCF system 10 includes first and second regulating circuits which regulate the output power of the system 10. The regulating circuits are responsive to one or more parameters of power produced at a point of regulation (POR). The first regulating circuit comprises a generator control 32 which controls the excitation of the generator 20 to in turn regulate the average of the phase output voltage magnitudes at the POR. The second regulating circuit comprises a converter control 34 which controls the inverter 26 so that individual phase voltage regulation is accomplished in a manner to be described in greater detail hereinafter.

Figure 3B:
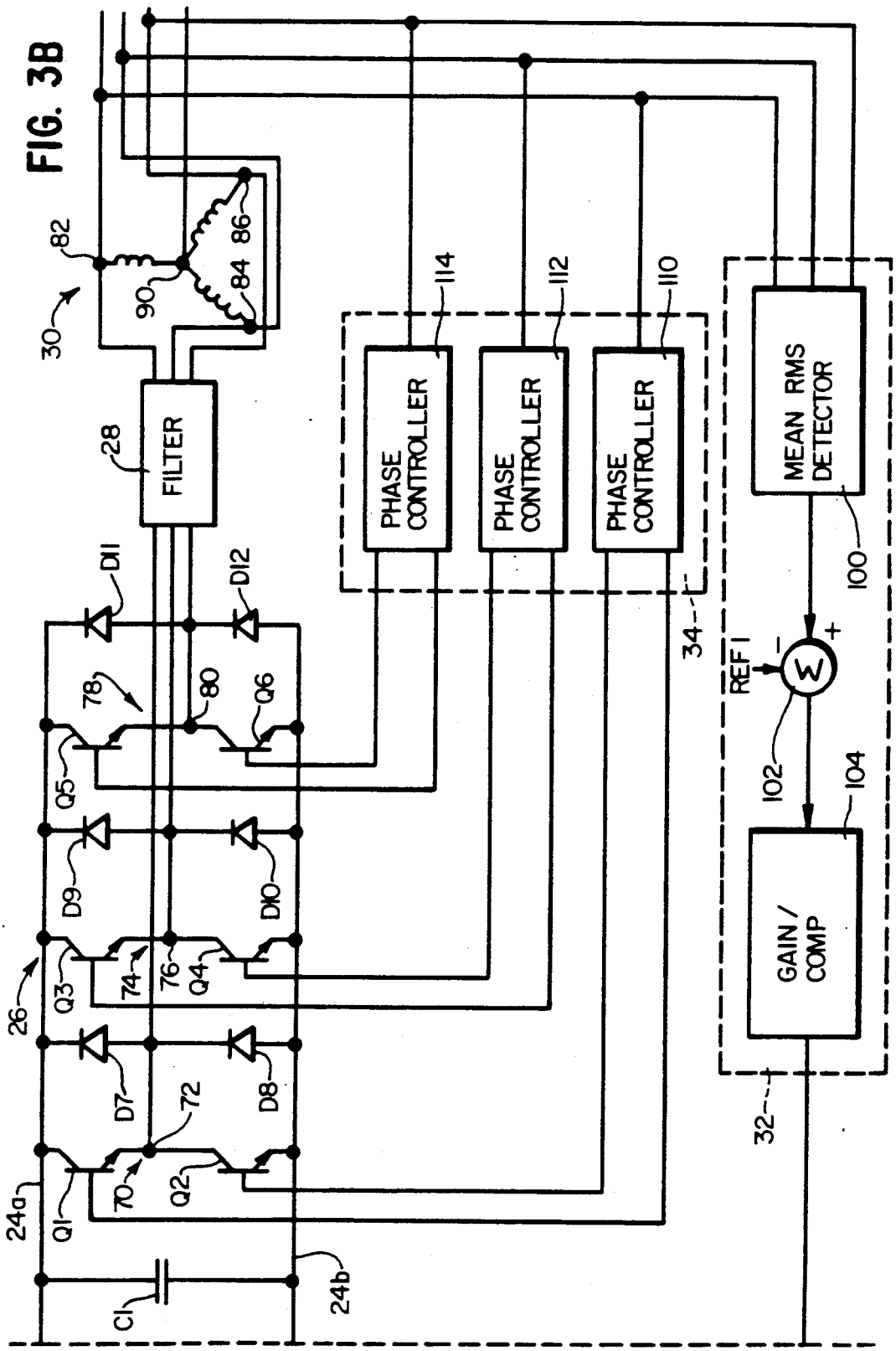

Referring now to FIGS. 3A and 3B, the generator 20 includes a permanent magnet generator (PMG) 40, an exciter portion 42 and a main generator portion 44 each of which includes elements mounted on a rotor 46 and a stator 48. The rotor 46 includes a shaft 50 which is rotated by the prime mover 12. A permanent magnet 52 of the PMG 40 is mounted on the rotating shaft 50 and establishes a rotating magnetic field which induces three-phase AC voltages and in PMG armature windings 54a–54c. The three-phase voltages are rectified by a rectifier 56 and the resulting DC power is regulated by a voltage regulator 58 such that a controlled magnitude of DC current is provided to an exciter portion field winding 60. The DC current flowing in the winding 60 induces AC voltages in a set of rotating exciter portion armature windings 62a–62c. The AC voltages are rectified by a rotating rectifier assembly 64 and the resulting DC power is supplied to a main generator portion field winding 66. The winding 66 is also mounted on the shaft 50 and rotation of such shaft 50 while current is flowing in the main generator portion field winding 66 causes three-phase voltages to be developed in a set of main generator portion armature windings 68a–68c.

The AC/DC converter 22 includes six diodes D1–D6 connected in a conventional three-phase bridge configuration. The diodes D1–D6 rectify the three-phase voltages produced in the armature windings 68a–68c and the resulting DC voltage is filtered by a DC link filter comprising a capacitor C1 to produce the DC power on the DC link conductors 24a, 24b.

The inverter 26 includes six power switches in the form of conventional bipolar transistors or insulated gate bipolar transistors Q1–Q6, together with associated flyback diodes D7–D12 connected in anti-parallel relationship therewith, respectively. The power switches Q1, Q2 and flyback diodes D7 and D8 form a first leg 70 of the inverter 26 and are connected together at a phase output terminal 72. In like fashion, the switches Q3, Q4 and diodes D9, D10 form a second leg 74 of the inverter 26 and are connected together at a phase output terminal 76. The switches Q5, Q6 and diodes D11, D12 form a third leg 78 of the inverter 26 and are connected together at a phase output terminal 80. The phase output terminals 72, 76 and 80 are coupled to the filter 28 and thence to end taps 82, 84 and 86, respectively, of the neutral forming transformer 30. The neutral forming transformer 30 develops a neutral voltage at a neutral terminal 90. The neutral terminal 90 and end terminals 82, 84 and 86 of the transformer 30 are connected to one or more AC loads (not shown).

The generator control 32 includes a mean RMS detector 100 which develops a signal representing the average of the RMS levels of the phase outputs from the filter 28 and transformer 30. This signal is summed by a summer 102 with a reference signal REF1 to produce an error signal which is processed by a gain and compensation unit 104 and delivered to the voltage regulator 58, FIG. 3A. The voltage regulator 58 is a conventional circuit which develops a controlled DC current at a magnitude determined by the compensated error signal developed by the unit 104 to in turn control the magnitude of the output voltages produced by the generator 20. This, in turn, controls the voltage on the DC link 24, and hence the average of the phase output voltages produced by the inverter 26.

The converter control 34 includes first through third phase controllers 110, 112 and 114 which are responsive to individual phase outputs from the filter 28 and transformer 30. The phase controller 110 controls the switches Q1 and Q2 whereas the phase controller 112 controls the switches Q3 and Q4 and the phase controller 114 controls the switches Q5 and Q6.

FIG. 4 illustrates the phase controller 110 in greater detail, it being understood that the phase controllers 112 and 114 are generally identical thereto, except that, as previously noted, they are responsive to the magnitude of different phase voltages developed at the output of the filter 28 and transformer 30. The phase controller 110 includes an RMS detector 120 which develops an output signal representing the RMS magnitude of the phase A output at the POR. This signal is provided to a non-inverting input of a comparator 122 having an inverting input which receives a reference signal REF2 representing a desired phase output magnitude. A resistor R1 is coupled between the output of the comparator 122 and the non-inverting input thereof. The resistor R1 causes the comparator 122 to have a hysteresis characteristic. The comparator 122 develops a comparison signal which is provided to an addressing unit 124 that develops a sequence of addresses for a memory 126. The memory 126 stores PWM switching patterns for the switches Q1 and Q2. The patterns are stored as a sequence of zeros and ones in successive memory locations and the successive memory locations are sequentially accessed to in turn provide the zeros and ones to an output of the memory 126. If desired, either a full 360° of each PWM pattern may be stored in the memory 126 or a portion of each cycle may be stored. In the latter event, circuitry (not shown) is included to produce a full 360° of each pattern from the data stored in the memory 126. A base drive/isolation circuit 128 develops suitable base drive signals for the switches Q1 and Q2 from the data stored in the memory 126. When a one is provided to an input of the circuit 128, the transistor Q1 is provided with a high state base drive signal whereas the switch Q2 is provided with a low state base drive signal, in turn causing the transistor Q1 to turn on and the transistor Q2 to turn off. Conversely, when a zero is developed at the input of the circuit 128, a low state base drive signal is provided to the switch Q1 and a high state base drive signal is provided to the switch Q2, in turn causing the transistor Q1 to turn off and the transistor Q2 to turn on. The angles within each cycle of the inverter output at which the switches of an inverter leg change conductive state are referred to as switching angles. These angles determine the amplitudes of harmonics present in the inverter output.

When an unbalanced three-phase load is coupled to the filter 28 and the transformer 30, one of the phase output voltages attempts to vary from the regulated value defined by the reference signal REF2. When this occurs, the addressing unit 124 of the respective controller selects a switching pattern from the memory 126 which in turn causes the amplitude of the fundamental component of the affected phase to be changed. This, in turn, causes triplen harmonics to appear across the phases of the AC load. However, by selecting a switching pattern which adjusts non-triplen harmonic content, triplen harmonic content can be limited. Set forth below are the switching angles for each 180° of two possible switching patterns which may be stored in the memory 126 together with a table indicating the amplitude of the fundamental and harmonics produced by such switching patterns. (In the latter table, a minus sign before the amplitude denotes the harmonic is 180° out of phase relative to the fundamental).

| SWITCHING ANGLES (IN DEGREES) | |
| --- | --- |
| PATTERN 1 | PATTERN 2 |
| 7.27 | 7.18 |
| 16.54 | 16.29 |
| 21.00 | 20.79 |
| 32.96 | 32.42 |
| 35.45 | 34.77 |
| 50.20 | 49.98 |
| 51.56 | 50.99 |
| 128.44 | 129.01 |
| 129.80 | 130.02 |
| 144.53 | 145.23 |
| 147.04 | 147.58 |
| 159.00 | 159.21 |
| 163.46 | 163.71 |
| 172.73 | 172.82 |

| HARMONIC AMPLITUDE | (As A Fraction Of And Relative To DC Link Voltage) | |
| --- | --- | --- |
|  | PATTERN 1 | PATTERN 2 |
| Fundamental | 1.08 | 1.10 |
| 3rd Harmonic | .063 | .077 |
| 5th Harmonic | 0 | −.020 |
| 7th Harmonic | 0 | −.010 |
| 9th Harmonic | −.034 | −.022 |
| 15th Harmonic | −.047 | −.037 |
| 21st Harmonic | −.253 | −.213 |
| 23rd Harmonic | −.485 | −.445 |
| 25th Harmonic | −.373 | −.402 |
| 27th Harmonic | −.131 | −.189 |
| 29th Harmonic | −.038 | −.051 |
| 31st Harmonic | −.007 | −.011 |
| 33rd Harmonic | .042 | .046 |
| 37th Harmonic | −.025 | −.032 |
| 39th Harmonic | .054 | .035 |
| 41st Harmonic | .018 | .04 |
| 43rd Harmonic | −.183 | −.123 |
| 45th Harmonic | −.209 | −.210 |

As the amplitude table above indicates the differences in triplen harmonic amplitude between the two patterns noted above are relatively small, e.g. the 21st harmonic amplitude differs by 0.253−213=0.04. Thus, in a situation where an unbalanced load is provided power by the inverter 26 and the switches of a first leg of the inverter are operated in accordance with pattern 1 above and the switches of a second leg of the inverter are operated in accordance with pattern 2 above, triplen harmonics limited to relatively small amplitudes are produced across the load phases coupled to the first and second inverter legs. If a low degree of triplen harmonic content can be tolerated in the inverter output, then individual phase voltage regulation can be accomplished. The limiting of the triplen amplitudes is achieved at the expense of increased amplitudes of non-triplen harmonics. Spreading the distortion in the inverter output over a number of harmonics in this manner permits total harmonic content and individual harmonic content specifications to be more easily met. Also, one consequence of achieving individual phase voltage regulation in this fashion is that the regulation requirement of the neutral forming transformer 30 can be reduced, in turn allowing a reduction in transformer mass.

I claim:

1. In a method of operating a full-bridge inverter having a plurality of phases each of which includes a switch which is operated to produce one of a set of phase output voltages an wherein a neutral voltage is derived solely from the phase output voltages and the output voltages have a fundamental component and harmonics thereof each having an amplitude, the improvement comprising the steps of:
    (a) comparing each phase output voltage to a reference;
    (b) selecting a switching pattern for each inverter switch in dependence upon the comparison of step (a) wherein the selected switching patterns for two of the phases are different; and
    (c) controlling each phase in accordance with the switching pattern selected for the switch therein whereby the amplitudes of particular harmonics present in the inverter output voltages relative to the neutral voltage are controlled to in turn limit the amplitude of other harmonics present in the inverter output voltages relative to the neutral voltage such that total harmonic distortion is held below a specified limit.

2. The improvement of claim 1, wherein the switching patterns are stored in a memory and wherein the step (a) comprises the step of retrieving the selected switching patterns from the memory.

3. The improvement of claim 1, wherein triplen and non-triplen harmonics are produced in the output voltages and wherein the step (b) includes the step of selecting a switching pattern for each inverter switch which results in amplitudes of non-triplen harmonics in the phase output voltages being adjusted to limit the amplitudes of triplen harmonics.

4. A control for a full-bridge inverter having three phase legs each including a pair of switches connected in series at a phase output terminal wherein the switches of each leg are operated to convert a DC voltage into a phase output voltage at the phase output terminal, the phase output voltages including a fundamental AC component and triplen and non-triplen harmonic AC components wherein each component has an amplitude, and wherein a neutral voltage is derived solely from the phase output voltages, comprising:
    first means for regulating an average of the phase output voltages by controlling the DC voltage; and
    second means for individually regulating each phase output voltage including means for operating the switches of each inverter leg in accordance with a switching pattern selected in dependence upon the amplitude of the fundamental AC component produced at the phase output terminal therebetween whereby the amplitudes of non-triplen harmonics present in the inverter output voltages relative to the neutral voltage are controlled to in turn limit the amplitude of triplen harmonics present in the inverter phase output voltages relative to the neutral voltage such that total harmonic distortion is held below a specified limit.

5. The control of claim 4, wherein the second means comprises first through third comparators for comparing the phase output voltages against a reference to obtain first through third comparison signals and first through third memories coupled to the first through third comparators each of which stores a plurality of switching patterns and provides a particular switching pattern to an associated pair of switches of a phase leg in dependence upon the comparison signal supplied thereon.

* * * * *